June 13, 1950  J. W. KAYLOR ET AL  2,511,344
MEANS FOR FEEDING AND SUPERIMPOSING TWO FILMS
Filed March 13, 1948  2 Sheets-Sheet 1

JAMES W. KAYLOR,
ARTHUR PHELPS,
LEONARD G. JONES,
WILTON R. HOLM,
BY Robert W. Fulwider
ATTORNEY.

June 13, 1950 — J. W. KAYLOR ET AL — 2,511,344
MEANS FOR FEEDING AND SUPERIMPOSING TWO FILMS
Filed March 13, 1948 — 2 Sheets-Sheet 2

JAMES W. KAYLOR,
ARTHUR PHELPS,
LEONARD G. JONES,
WILTON R. HOLM,

By Robert D. Fulwider
ATTORNEY.

Patented June 13, 1950

2,511,344

UNITED STATES PATENT OFFICE 2,511,344

MEANS FOR FEEDING AND SUPERIMPOSING TWO FILMS

James W. Kaylor, Burbank, Arthur F. Phelps, West Hollywood, Leonard G. Jones, North Hollywood, and Wilton R. Holm, West Hollywood, Calif., assignors to Cinecolor Corporation, a corporation of California Application March 13, 1948, Serial No. 14,664

11 Claims. (Cl. 88—17)

Our invention relates generally to the feeding of film to motion picture cameras, and more particularly to the feeding and simultaneous superpositioning of two separate film strips to provide what is known as "bi-pack" film.

In the commercial production of motion pictures in natural color, it has been found most convenient to employ two or more separate negatives or films on which the various color aspects of the scene are recorded. For example, in the so-called three color method of photography, three separate films are used to record the blue, green and red components of the scene being photographed. In the so-called two color process, the blue-green components are recorded on one film, while the orange-red components are recorded on a separate film. Whether the two color or three color process is used, it has been found most convenient to place two of the films together with their respective emulsions in face to face contact, forming a so-called "bi-pack."

It is possible to place the two films together and wind them, in superimposed relationship, upon a single supply reel from which the bi-pack film is then fed to the camera. However, because of the different distances from the center of the reel, the two films have a tendency to slip or wrinkle with respect to one another, thereby causing difficulties in the mechanical operation of the camera. The effect is particularly noticeable where relatively large quantities of film are wound upon a single reel, since the effect is cumulative. Furthermore, it will be appreciated that the space required for a given length of bi-pack will be roughly equal to twice that required for an equal length of single thickness film. These factors become particularly objectionable when commercially produced motion pictures are being filmed, since it has heretofore been considered impractical to wind more than 400 feet of bi-pack upon a single reel, while a single thickness black and white film may be conveniently wound in thousand foot lengths. As a result, the time necessary for loading and reloading the camera is more than doubled when bi-pack film is used, and the film wastage is considerably increased.

It has heretofore been suggested to mount two separate supply reels one above the other and superimpose the lower film upon the upper film as the pair are drawn from their respective reels. However, this has resulted in a very ungainly and inconvenient camera, and this method has never attained wide popularity.

It is therefore a major object of our invention to provide an improved means of feeding film from separate reels into a camera in superposed relationship.

Another object of our invention is to provide a means for superimposing two films which is readily applicable to existing cameras and equipment.

It is a further object of our invention to provide such a means for superimposing two films that, when used with a camera, it produces an attractive and convenient operating assembly.

It is a still further object of our invention to provide such means which are very inexpensive in both first cost and operation while producing results equal to or better than those previously obtainable.

These and other objects and advantages of our invention will become apparent from the following description of preferred and modified embodiments thereof, and from the drawings illustrating those embodiments in which.

Figure 1:
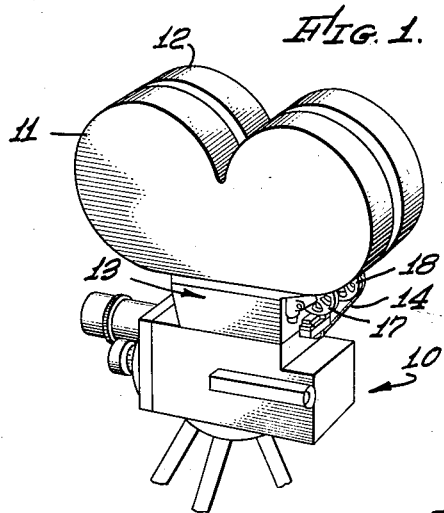
Fig. 1 is a perspective view of a motion picture camera with our adapter thereon and with two separate magazines located on the adapter to supply the two separate films.

Referring now to the drawings and particularly to Fig. 1 thereof, the numeral 10 indicates generally a camera of any conventional type, generally having a housing adapted to receive a single film magazine. While bi-pack film may be supplied to this camera from a single reel, we have found it preferable when using such film to use two separate supply reels in side-by-side relationship, these reels conveniently being separately contained within magazines 11 and 12. Since the conventional camera is not designed to receive two magazines, it is necessary to place an adapter 13 between the camera 10 and the magazines 11 and 12 in order to mount and support the latter and to direct the films therefrom.

It is intended that the magazines 11 and 12, together with the camera 10, be of any conventional and well-known type designed for use with each other, and consequently the camera 10 is provided with a belt 14 or other suitable form of drive adapted to operate the take-up reel within the single magazine normally used. Since two magazines are now to be used instead of one, and the position of these magazines with respect to the camera 10 is slightly changed, the adapter 13 is provided with an idler shaft 15 at its rear end carrying a pulley 16 adapted to receive the belt 14. Other pulleys 17 and 18 are mounted on the shaft 15 for rotation with the pulley 16, and are suitably located to operate the take-up reels of the magazines 11 and 12.

To provide the most compact and convenient mounting for these magazines, they are mounted in a spaced side-by-side relationship as indicated in Fig. 1. As a result, the film strips from the two separate supply reels within the respective magazines 11 and 12 will emerge from those magazines in a coplanar side-by-side relationship, and must be superimposed within the adapter 13 to provide the face-to-face relationship of bipack films. Our preferred method of accomplishing this is to cause one of the films to travel a circuitous path within the adapter 13, while the other film travels a more or less straight, conventional path. The general path of the two film strips in their passage through the adapter 13 is shown somewhat schematically in Fig. 7 where it will be seen that film 21, from magazine 11, is looped and laterally displaced to be superimposed upon film 22 from magazine 12. After the films 21 and 22 have been placed in superposition to produce the desired bi-pack arrangement, they continue their downward travel into the camera. There they are exposed, and are then returned to the adapter 13, still superimposed, where they are separated, with the film 21 being looped and laterally displaced to enter the magazine 11 where it is wound upon a take-up reel. As hereinafter indicated, the general method of lateral displacement of the film 21 in its return passage through the adapter 13 after it has passed through the camera, is substantially identical with that shown in Fig. 7, with the directions of film travel reversed.

Figure 2:
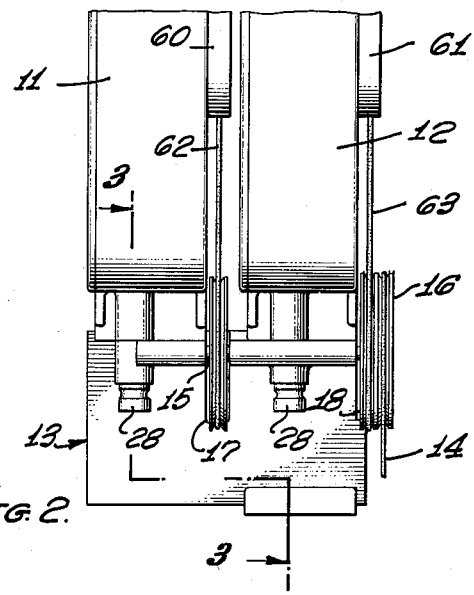
Fig. 2 is a fragmentary rear elevational view, with a pair of magazines mounted on the camera.
Figure 3:
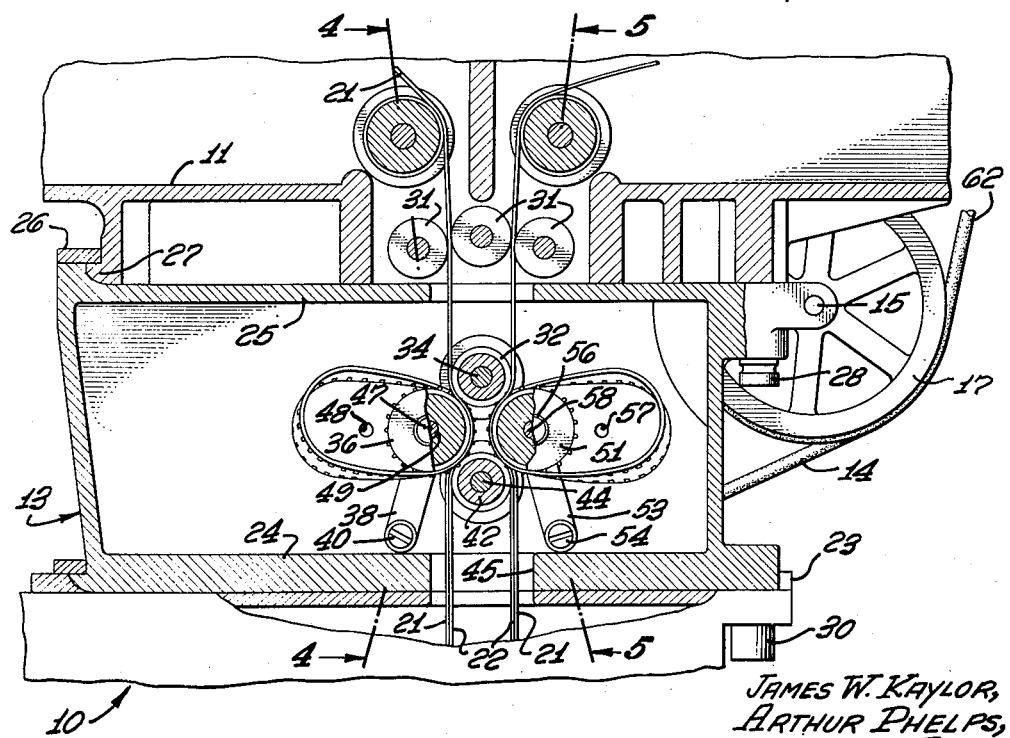
Fig. 3 is a sectional view taken on the line 3—3 of Fig. 2.
Figure 4:
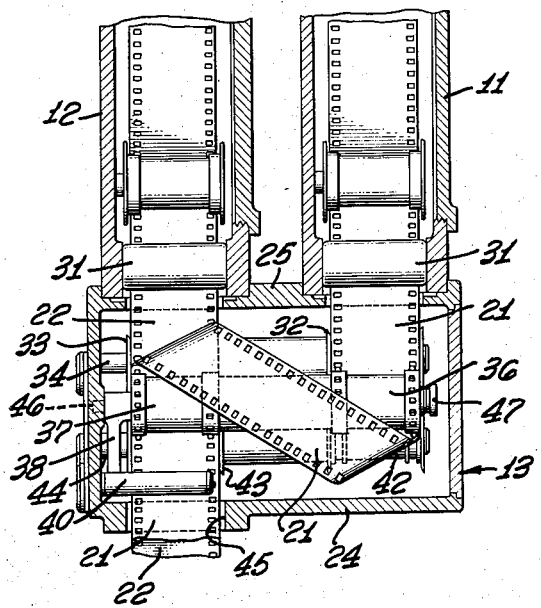
Fig. 4 is a sectional view taken on the line 4—4 of Fig. 3, showing the path of the films from the supply reels.
Figure 5:
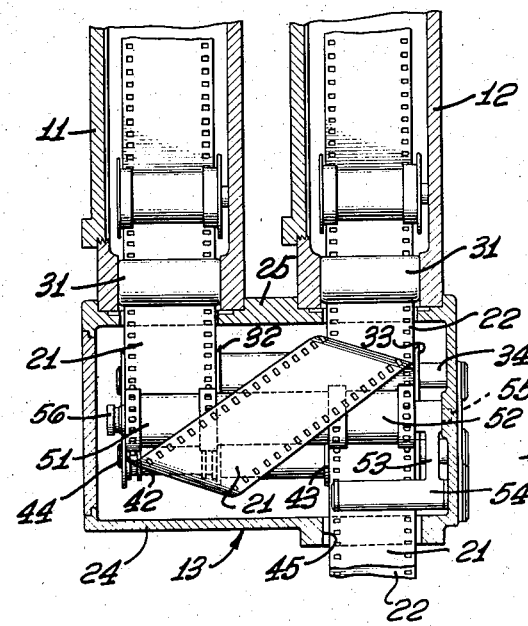
Fig. 5 is a sectional view taken on the line 5—5 of Fig. 3 and showing the path of the films returning to their separate take-up reels.

Considering now the construction details of our adapter 13, it will be seen in Fig. 3 that the adapter includes a housing having a lower wall 24 designed to fit within the usual magazine receiving channel 23 of the camera 10, making a light-tight fit therewith to prevent any fogging of the films. The upper surface of the adapter 13 is closed by an upper wall 25 suitably shaped to receive the two magazines 11 and 12 in spaced side-by-side relationship. By way of example only and not as a limitation, the particular equipment with which the adapter illustrated is designed to be used has a rearwardly projecting overhanging lip 26 formed at the forward end of the adapter to receive and hold a corresponding flange 27 formed on the lower edge of the magazines 11 and 12. At the rear end of the mounting section of each of the magazines, an upwardly extending tapped hole (not shown) is provided to receive a thumb screw 28 which extends upwardly from the rear end of the adapter 13. A corresponding screw 30 is mounted in the camera 10 to hold the adapter 13 to the camera or to hold a magazine thereto when the adapter is not used. As illustrated in Figs. 2, 4 and 5, the adapter 13 is designed to receive the two magazines 11 and 12 upon its upper surface, with a convenient separation space between the two magazines.

Within the magazines 11 and 12 there is generally provided an arrangement of rollers 31 to act as a light trap to prevent the admission of light into the magazine. As indicated, these rollers also serve the further purpose of keeping the film from the supply reel separated a predetermined distance from the film returning to the take-up reel, and this same separation of unexposed and exposed film is maintained generally within our adapter. Within the latter, as illustrated in Fig. 3, we provide a film guide roller 32 whose axis is substantially parallel to that of the roller assembly 31 and which is generally vertically aligned with the center roller of that assembly of the magazine 11. A similar roller 33 is aligned with the corresponding light trap roller 31 of the magazine 12, the rollers 32 and 33 being coaxial and mounted on a shaft 34 preferably attached to the side wall of the adapter 13.

Cooperating with the guide rollers 32 and 33 and located downwardly and forwardly therefrom, are a pair of film sprockets 36 and 37 respectively, mounted on a supporting body 38 which in turn is pivotally supported by a shaft 40 conveniently attached to the wall of the adapter 13. Preferably, the sprockets 36 and 37 are formed as separate portions of a single member so that there is absolute synchronism in their rotation and, of course, both sprockets are of substantially the same size.

Beneath the sprockets 36 and 37, parallel to the rollers 32 and 33 and substantially aligned with the latter, are a second pair of film guide rollers 42 and 43. Like the first guide rollers, the rollers 42 and 43 are mounted for rotation upon a shaft 44 which is preferably supported by a wall of the adapter 13.

Figure 7:
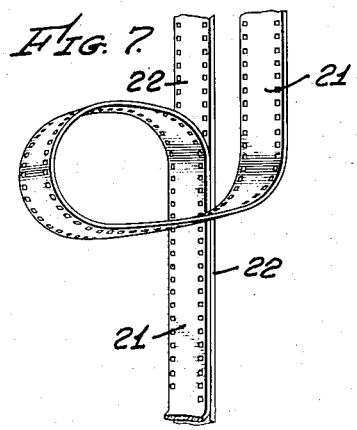
Fig. 7 is a diagrammatic view of a pair of films showing their path of travel from the supply reels to the camera through the adapter.

With this construction, it will be seen by referring to Fig. 4 that the film 22 may be passed downwardly from the magazine 12, along the forward surface of the guide roller 33, engaging the rear sprocket teeth of the sprocket 37, and continuing downwardly over the forward surface of the guide roller 43. In a somewhat similar manner, the film 21 passes downwardly from the magazine 11, over the forward face of the guide roller 32, engaging the rear sprocket teeth of the sprocket 36, and passing along the forward surface of the guide roller 42. However, instead of then continuing its downward passage, the film 21 is helically looped as indicated in Figs. 4 and 7, being laterally displaced while passing to a point above the sprocket 37 where it is superimposed upon the film 22. The two films then continue downwardly, passing between the sprocket and the guide rollers 33 and 43, and out through a film slot 45 formed in the bottom of the adapter 13. From the film slot 45, the films 21 and 22, superimposed to form a bi-pack, pass downwardly into the interior of the camera 10 where they are exposed in the usual manner.

It will be realized that if an attempt is made to thread the films 21 and 22 through the adapter in the method just described, considerable difficulty will be exeprienced if the sprockets 36 and 37 remain in their operative position against the rollers 32, 33, 42 and 43 at all times. Consequently, we have mounted the film sprockets 36 and 37 upon the member 38 which is pivotal about the shaft 40 as previously described. A spring pressed plunger 49 extends through the member 38, preferably coaxial with the sprockets 36 and 37, and is resiliently urged into a recess 46 formed in the wall or other suitable member of the adapter 13. The recess 46 is so located that when the plunger is inserted therein, the sprockets 36 and 37 are in their normal operative position, and a knob 47 or other suitable means is provided on the opposite end of the plunger to enable the latter to be retracted and removed from the recess so that the entire sprocket assembly may be pivoted about the axis of the shaft 40, away from the film guide rollers 32, 33, 42 and 43. If desired, an additional recess 48 may be provided in the wall of the adapter 13 to retain the sprockets in their separated position while the adapter is being threaded.

It is customary in equipment of this type to so locate the film guide rollers 32, 33, 42 and 43 with respect to the sprockets 36 and 37 that only sufficient clearance exists therebetween for the passage of the film. Consequently, while the rollers 32 and 42 have only one thickness of film between them and the sprocket 36, the rollers 33 and 43 have two thicknesses of film between them and the sprocket 37. Consequently, we have found it desirable to reduce the radius of the rollers 33 and 43 a slight amount from that of the rollers 32 and 42 to compensate for the different thickness of film passing between them. While the difference in radius is quite small, being in the order of .006 inch, it is very desirable in precision equipment of this type that all of these factors be taken into account.

After the bi-pack film has been exposed in the camera, it is returned through the film slot 45, passing upwardly behind the downwardly traveling film. To separate the films 21 and 22, a film sprocket arrangement substantially identical to that previously described is located to the rear of the film guide rollers 32, 33, 42, and 43. As indicated in Figs. 3 and 5, film sprockets 51 and 52, identical and aligned with sprockets 36 and 37 respectively, are mounted on a member 53 which is pivotally supported by a shaft 54 attached to the wall or other supporting member of adapter 13. A recess 55 is adapted to receive a spring pressed plunger 58 which may be retracted by a knob 56, while an auxiliary recess 57 may be provided to hold the sprocket assembly in threading position. In their normal operative position, the sprockets 51 and 52 cooperate with the film guide rollers 32, 33, 42 and 43 in the same manner that the sprockets 36 and 37 do. Consequently, the bi-pack film passes over the rear surface of the film guide roller 33, and over the forward surface of the film sprocket 52. At this point, the films 21 and 22 are separated, the film 22 continuing upwardly, over the rear surface of the film guide roller 33, into the magazine 12. Film 21, however, is looped to pass downwardly and laterally to the rear surface of guide roller 42, passing upwardly therefrom along the forward surface of the sprocket 51 and thence upwardly, along the rear surface of roller 32, into the magazine 11 where it is wound upon the take-up reel. The path of the films 21 and 22 in passing from the camera 10 into the magazines 11 and 12 is thus the reverse of that shown in Fig. 7, where the films are indicated as passing from the magazines and into the camera.

Since the sprockets 36 and 37 rotate in synchronism with each other, and are the same diameter, it will be apparent that the films 21 and 22 will be supplied to the camera 10 at the same linear speed, thereby preventing any possibility of binding, buckling, or relative linear movement between the two. In a similar manner, the film from the camera is returned to the take-up reels so that both films 21 and 22 move at identical speeds, thereby insuring satisfactory operation of the camera.

As is customary in the motion picture art, only the take-up reels within the magazines 11 and 12 are driven by external means, the supply reels being rotated by the removal of film therefrom. Since the speed of rotation of the take-up reels will vary with the amount of previously wound film thereon, it is customary to provide a clutch or other suitable means between the source of driving power and the reel itself. Since magazines 11 and 12 are conventional magazines now available on the market, the construction of the magazines and their particular mode of operation form no part of the present invention except as they may cooperate and be combined with the adapter 13. However, it is necessary to provide some form of driving power to the take-up reels, and this is generally accomplished by a belt and pulley arrangement, as previously suggested. Each magazine is customarily supplied with an externally mounted pulley connected through the previously mentioned clutch means to the take-up reel within the magazine. In Fig. 2, the pulleys of the magazines 11 and 12 are provided with annular protective rings 60 and 61, respectively, and belts 62 and 63 respectively are used to drive the corresponding pulleys. The lower ends of the belts 62 and 63 pass over pulleys 17 and 18, respectively, these pulleys being rotatably mounted upon the rear of the adapter 13 and driven by the pulley 16 and belt 14 as previously described.

It will thus be seen that to adapt the conventional motion picture camera to the use of bi-pack film, using two separate supply and take-up reels for the two constituent film strips of the bi-pack, it is only necessary to install our adapter 13 upon the camera 10 in place of the conventional magazine, place two conventional magazines 11 and 12 upon the adapter, and then thread the films through the latter as previously described.

The location of the drive pulley 16 is somewhat different from that of the usual pulley of the conventional magazine when used alone, but this may be compensated for by changing the length of the belt 14. When these few changes have been accomplished, the camera may then be used in the customary manner, all photography being done as formerly, with the exception that the resulting negative films may be processed to provide color separation images.

Figure 6:
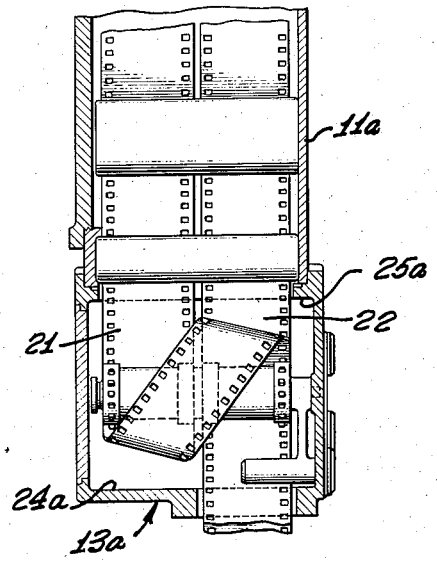
Fig. 6 is a view similar to Fig. 5 showing the construction of a preferred form of adapter intended for use with a single magazine.

When they are available, we have found that magazines adapted to take multiple width films may be converted to perform the functions of the two separate magazines 11 and 12. In Fig. 6 we have shown how this may be accomplished in a magazine adapted to receive film seventy millimeters wide, the standard motion picture film being thirty-five millimeters wide. In general, the construction of the adapter 13a is similar to that of the adapter 13 previously described with the exception that since the films 21 and 22 are much closer together, the adapter may be correspondingly narrower. The lower wall 24a of the adapter 13a is designed to fit within the standard magazine receiving coupling of the camera 10, while the upper wall 25a is adapted to receive the multiple width magazine 11a.

Instead of receiving a single multiple width film, as the magazine 11a is designed to do, we instead place two single width films within the magazine, placing these films immediately adjacent each other and so that they are supplied by the magazine in a side-by-side relationship. It will be realized that this results in a single magazine supplying films 21 and 22 in a manner very similar to that provided by the magazines 11 and 12 with the exception that the films are separated a smaller distance, and but a single magazine is required. The adapter 13a will thus be substantially identical with the previously described adapter 13 with the exception that the various film guide rollers and sprockets will be displaced laterally toward each other, to align with the paths of the films 21 and 22. This construction is illustrated in Fig. 6, where the various parts are given the same number as their previously described counterparts, with the addition of the letter "a."

Because of the convenience in operation, the form shown in Fig. 6 at present constitutes our preferred form. However, where the multiple width magazines such as shown in Fig. 6 are unavailable, the optional form illustrated in Figs. 1 to 5 will be used. In either case, however, it will be realized that the adapter 13 or 13a is capable of making a light-tight seal with the camera 10, and with the magazines 11a or 11 and 12. In a similar manner, the interior of the adapter normally has all light excluded therefrom, though one of the side walls is preferably removable for ease in threading the films 21 and 22 through the adapter. As a final point of distinction between the two adapters, where the previously described adapter 13 has the shaft 15 and the pulleys 16, 17 and 18 mounted thereon to drive the take-up reels, the adapter 13a normally has this feature omitted since the usual belt adapted to drive the single take-up reel of the conventional magazine may be suitably extended to engage the single shaft carrying the two take-up reels of the multiple width magazine 11a.

Where the film magazines for the camera are to be constructed for use in accordance with our invention, as opposed to the modification of existing magazines, it will generally be found desirable to construct these magazines in the general form shown in Fig. 6. Under these circumstances, the adapter may be incorporated in the magazine as a portion of the latter so that the two form an integral unit, having an upper portion adapted to receive two coaxial supply reels, a lower portion where the films from these reels are superimposed and later separated, and a space in the upper portion to receive two coaxial take-up reels. In this manner, the changing of film magazines during the photographing of a picture is reduced to its simplest elements; while retaining all the advantages of our invention. The construction of such a combined magazine and adapter is believed to be obvious to those skilled in the art from the description heretofore given, and hence further elaboration is believed unnecessary.

From the foregoing, it will be appreciated that we have developed a new and improved means and method of feeding film to motion picture cameras, whereby a pair of separate film strips from individual coaxial supply reels may be superimposed and then passed through the camera in the conventional manner. While there are obvious modifications which may be made in our method and means, the modifications are believed obvious to those skilled in the art, and clearly within the scope of this invention as defined by the appended claims. Therefore, we do not wish to be restricted to the particular form or arrangement of parts herein described and shown, except as limited by the following claims.

We claim:

1. A device for superimposing film which includes: film guide rollers adapted to receive a pair of film strips in side-by-side relationship; other film guide rollers spaced from said first-mentioned film guide rollers and parallel thereto; and film sprocket means cooperating with said film guide rollers to receive and guide one of said films between said sprocket means and said guide rollers without substantial lateral deviation, and to receive and guide the other of said film strips between said sprocket means and said guide rollers, form a helical loop around said sprocket means to bring said other film strip into superposition with said one of said films, said other film thereafter again passing with said one of said films between said sprocket means and said guide rollers, whereby said films emerge as bi-pack film.

2. A device for superimposing film which includes: a housing adapted to be received upon a camera; film guide rollers within said housing, positioned to receive a pair of film strips in side-by-side relationship; other film guide rollers within said housing spaced from said first-mentioned film guide rollers and aligned therewith; film sprocket means cooperating with said film guide rollers to receive one of said films and pass it through said housing, between said sprocket means and said guide rollers without substantial lateral deviation, and to receive the other of said film strips and pass it between said sprocket means and said guide rollers, form a helical loop to bring said other film strip into superposition with said one of said films, and thereafter pass said other film strip with said one of said films between said sprocket means and said guide rollers, whereby said films emerge from said housing as bi-pack film; and a second film sprocket means cooperating with said film guide rollers to receive said one of said films and return it through said housing between said second sprocket means and said guide rollers without substantial lateral deviation, and to receive said other of said films and pass it between said second film sprocket means and said guide rollers in superposition with said one of said films, form a helical loop to separate said films and laterally displace said other of said films, and thereafter pass it between said second sprockett means and said film guide rollers to be discharged from said housing in side-by-side relationship with said one of said films.

3. A device for feeding film which includes: a housing adapted to fit upon a camera and to receive a film magazine; a first pair of film guide rollers mounted within said housing for simultaneous rotation, each of said rollers being adapted to receive a film strip, said strips being laterally displaced from each other; a second pair of film guide rollers mounted within said housing for simultaneous rotation, said second pair of rollers being parallel to and aligned with said first pair of rollers and displaced therefrom in a direction toward said camera; a first pair of film sprockets parallel to said first and second pairs of film guide rollers and spaced forwardly therefrom a distance sufficient to receive film therebetween; a member pivotally attached to said housing and carrying said first pair of film sprockets whereby the latter may be held in operative position adjacent said film guide rollers, or separated therefrom in film threading position; manually operable means to hold said first pair of film sprockets in either operative or threading position; a second pair of film sprockets parallel to said first and second pairs of film guide rollers and spaced rearwardly therefrom a distance sufficient to receive film therebetween; another member pivotally attached to said housing and carrying said second pair of film sprockets whereby the latter may be held in operative position adjacent said film guide rollers, or separated therefrom in film threading position; and another manually operable means to hold said second pair of film sprockets in either operative or threading position, whereby said first and second pairs of film sprockets may be placed in threading position, a first film passed over the forward surface of a first one of said first pair of film guide rollers, rearwardly of the cooperating sprocket of said first pair of film sprockets, over the forward surface of the cooperating roller of said second pair of film guide rollers, into said camera and back into said housing, over the rear surface of said cooperating roller of said second pair of film guide rollers, forwardly of the cooperating sprocket of said second pair of film sprockets and over the rear surface of said first one of said first pair of film guide rollers, while a second, laterally displaced film may be passed over the forward surface of the other of said first pair of film guide rollers, rearwardly of the remaining sprocket of said first pair of film sprockets, over the forward surface of the remaining roller of said second pair of film guide rollers, upwardly and laterally in a helical loop to a superimposed position on said first film above the sprocket of said first pair of film sprockets associated therewith, thence with said first film through said camera and to a position above said cooperating sprocket of said second pair of film sprockets, downwardly and laterally in a helical loop to the rear surface of said remaining roller of said second pair of film guide rollers, forwardly of the remaining sprocket of said second pair of film sprockets, and over the rear surface of the other of said first pair of film guide rollers, and said first and second pairs of film sprockets may be returned to operative position, said device then receiving laterally separated films, superimposing them to form bi-pack film which is delivered to a camera, receiving said bi-pack from said camera, separating said films, and returning said films in laterally spaced relationship.

4. A device as described in claim 3 in which said housing is adapted to receive a single magazine carrying a pair of laterally separated films, and the corresponding rollers and sprockets within said housing are aligned with their respective films.

5. A device as described in claim 3 in which said housing is adapted to receive a pair of laterally spaced magazines each carrying a single film, the corresponding rollers and sprockets within said housing are aligned with their respective films, and an idler shaft is mounted externally on said housing and provided with pulleys adapted to be driven by said camera and to drive take-up reels in said magazines.

6. An adapter mounting on a camera for superimposing films exteriorly of said camera, which includes: a housing having a lower surface shaped to cooperate with the portion of said camera adapted to receive a single-film magazine, said lower surface having an aperture therein aligned with the corresponding aperture of said camera; means on the upper surface of said housing to receive at least one film magazine, with an aperture in said upper surface to receive a first and a second film in side-by-side relationship; upper film guide rollers positioned to receive said first and second films in side-by-side relationship from said aperture in said upper surface; lower guide rollers parallel to but spaced from said upper rollers; and film sprocket means parallel to said upper and lower guide rollers and cooperating therewith to engage said first and second films for movement thereof in unison, said guide rollers and sprocket means being so positioned that said first and second films enter said housing in side-by-side relationship and said first film continues between said guide rollers and said sprocket means without lateral deviation, and out said aperture in said lower surface, while said second film passes between said guide rollers and said sprocket means, is helically looped to displace it laterally and superimpose it on said first film, and thereafter passes between said guide rollers and said sprocket means with said first film and out said aperture in said lower surface, said films returning in superimposed position through said last-mentioned aperture, being separated by said guide rollers and sprocket means in a manner the reverse of that previously described, and then passing out said aperture in said upper surface, in side-by-side relationship.

7. An adapter mounting on a camera for superimposing films exteriorly of said camera, which includes: a housing having a lower surface shaped to cooperate with the portion of said camera adapted to receive a single-film magazine, said lower surface having an aperture therein aligned with the corresponding aperture of said camera; means on the upper surface of said housing to receive at least one film magazine, with an aperture in said upper surface to receive a first and a second film in side-by-side relationship; upper film guide rollers positioned to receive said first and second films in side-by-side relationship from said aperture in said upper surface; lower guide rollers parallel to but spaced from said upper rollers; a first film sprocket means parallel to said upper and lower guide rollers and forwardly thereof, nomally bearing against said upper and lower guide rollers to engage said first and second films for movement thereof in unison; and a second film sprocket means parallel to said upper and lower guide rollers and rearwardly thereof, normally bearing against said upper and lower guide rollers to engage said first and second films for movement thereof in unison, said upper and lower guide rollers and said first and second sprocket means being so positioned that said first and second films enter said housing in side-by-side relationship and said first film continues between said guide rollers and said first sprocket means without lateral deviation, and out said aperture in said lower surface, while said second film passes between said guide rollers and said first sprocket means, is helically looped to displace it laterally and superimpose it on said first film, and thereafter passes between said guide rollers and said first sprocket means with said first film and out said aperture in said lower surface, said films returning in superimposed position through said last-mentioned aperture, being separated by said guide rollers and said second sprocket means in a manner the reverse of that previously described, and then passing out said aperture in said upper surface, in side-by-side relationship.

8. An adapter mounting on a camera for superimposing films exteriorly of said camera, which includes: a housing having a lower wall whose exterior is shaped to fit within that portion of said camera designed to receive a single-film magazine, said lower wall having a first aperture therein aligned with a corresponding aperture in said camera; an upper wall on said housing shaped to receive a film magazine, having a second aperture therein aligned with the corresponding aperture of said magazine and of a size to receive a first and a second film in parallel side-by-side relationship; end walls connecting said upper and lower walls; a fixed side wall; a side wall movable from an open position to a closed position; an upper film guide roller attached to said fixed side wall and substantially parallel to said second aperture; a lower film guide roller attached to said fixed side wall and substantially parallel to said first aperture, said first and second film guide rollers each being of a size to receive said first and second films in parallel side-by-side relationship; and film sprocket means within said housing and cooperating with said first and second film guide rollers to move said first and second films in unison through said housing.

9. An adapter mounting on a camera for superimposing films exteriorly of said camera, which includes: a housing having a lower wall whose exterior is shaped to fit within that portion of said camera designed to receive a single-film magazine, said lower wall having a first aperture therein aligned with a corresponding aperture in said camera; an upper wall on said housing shaped to receive a film magazine, having a second aperture therein aligned with the corresponding aperture of said magazine and of a size to receive a first and a second film in parallel side-by-side relationship; end walls connecting said upper and lower walls; a fixed side wall; a side wall movable from an open position to a closed position; an upper film guide roller attached to said fixed side wall and substantially parallel to said second aperture; a lower film guide roller attached to said fixed side wall and substantially parallel to said first aperture, said first and second film guide rollers each being of a size to receive said first and second films in parallel side-by-side relationship; a forward film sprocket means within said housing between said first and second film guide rollers to move said first and second films in unison through said housing while superimposing them; and a rearward film sprocket means within said housing between said first and second film guide rollers to move said first and second films through said housing while separating them from superimposed position and placing them in parallel side-by-side relationship.

10. A device for superimposing and separating film, which includes: a housing for mounting upon a camera, having a film aperture positioned to align with the film aperture of said camera; film guide rollers spaced from said aperture but parallel thereto to receive a pair of film strips in side-by-side relationship; other film guide rollers parallel to said first-mentioned film guide rollers and intermediate the latter and said housing aperture; a first rotatable member having its axis of rotation parallel to the axes of said film guide rollers and forwardly thereof, said first rotatable member and said film guide rollers cooperating to receive and transport a pair of film strips therebetween, said film strips passing over said first-mentioned film guide rollers in side-by-side relationship, one of said film strips then passing, without lateral deviation, between said first rotatable member and said other film guide rollers and out said housing aperture, while the other of said film strips is helically looped to superimpose upon said one of said film strips adjacent said first-mentioned film guide rollers and then travels with said one of said film strips and out said housing aperture; and a second rotatable member having its axis of rotation parallel to the axes of said film guide rollers and rearwardly thereof, said second rotatable member and said film guide rollers cooperating to receive and transport a pair of film strips therebetween, said film strips being received in superimposed relationship from said housing aperture, and separated and placed in side-by-side relationship in a manner the reverse of that previously described.

11. A device for superimposing film, which includes: first film guide roller means positioned to receive a pair of films in side-by-side relationship; second film guide roller means parallel to said first film guide roller means; and third film guide roller means parallel to said first and second film guide roller means and laterally displaced therefrom, at east one of said film guide roller means having means for positively engaging and driving said films, said third film guide roller means cooperating with said first and second film guide roller means to receive and transport a pair of film strips therebetween, one of said film strips passing therebetween without lateral deviation, while the other of said strips passes between said first and third film guide roller means side-by-side with said one film, is helically looped to superimpose upon said one film, and thereafter passes, with said one film, between said first and third and between said second and third film guide roller means.

JAMES W. KAYLOR.
ARTHUR F. PHELPS.
LEONARD G. JONES.
WILTON R. HOLM.

REFERENCES CITED

The following references are of record in the file of this patent:

UNITED STATES PATENTS

| Number | Name | Date |
|---|---|---|
| 2,072,091 | Ball et al. | Mar. 2, 1937 |
| 2,353,797 | Tondreau | July 18, 1944 |